US00RE42005E

(19) United States
(12) Reissued Patent
Jost et al.

(10) Patent Number: US RE42,005 E
(45) Date of Reissued Patent: Dec. 28, 2010

(54) AUTOMATIC PROXIMITY FAUCET

(75) Inventors: George J. Jost, Lake in the Hills, IL (US); Sean Bellinger, Kenosha, WI (US); Jerry McDermott, Lake Bluff, IL (US)

(73) Assignee: Technical Concepts LLC, Mundelein, IL (US)

(21) Appl. No.: 12/368,392

(22) Filed: Feb. 10, 2009

Related U.S. Patent Documents

Reissue of:
(64) Patent No.: 7,174,577
Issued: Feb. 13, 2007
Appl. No.: 11/067,549
Filed: Feb. 25, 2005

U.S. Applications:
(63) Continuation-in-part of application No. 10/757,839, filed on Jan. 14, 2004, now Pat. No. 7,083,156.
(60) Provisional application No. 60/441,091, filed on Jan. 16, 2003.

(51) Int. Cl.
*E03C 1/05* (2006.01)

(52) U.S. Cl. ..... 4/623; 251/129.04
(58) Field of Classification Search ..... 251/129.04, 251/129.03, 129.11, 30.02; 4/623; 137/801
See application file for complete search history.

(56) References Cited

U.S. PATENT DOCUMENTS

| | | | |
|---|---|---|---|
| 4,762,273 | A | 8/1988 | Gregory et al. |
| 4,788,998 | A | 12/1988 | Pepper et al. |
| 4,886,207 | A | 12/1989 | Lee et al. |
| 4,995,585 | A | 2/1991 | Gruber et al. |
| 5,244,179 | A | 9/1993 | Wilson |
| 5,427,350 | A | 6/1995 | Rinkewich |
| 5,431,181 | A | 7/1995 | Saadi et al. |
| 5,549,273 | A | 8/1996 | Aharon |
| 5,566,702 | A | 10/1996 | Philipp |
| 5,694,653 | A | 12/1997 | Harald |
| 5,730,165 | A | 3/1998 | Philipp |
| 5,918,855 | A | 7/1999 | Hamanaka et al. |
| 5,996,965 | A | 12/1999 | Eichholz et al. |
| 6,202,980 | B1 | 3/2001 | Vincent et al. |
| 6,273,394 | B1 | 8/2001 | Vincent et al. |
| 6,340,032 | B1 | 1/2002 | Zosimadis |
| 6,363,549 | B2 | 4/2002 | Humpert et al. |
| 6,619,320 | B2 | 9/2003 | Parsons |
| 7,083,146 | B2 | 8/2006 | Hiesener |

FOREIGN PATENT DOCUMENTS

| | | | |
|---|---|---|---|
| JP | 60 184781 | A | 9/1985 |
| WO | 2004065829 | A | 8/2004 |
| WO | 2004 065829 | A | 8/2004 |

OTHER PUBLICATIONS

Patent Abstracts of Japan, Feb. 1986, Japan.*

(Continued)

*Primary Examiner*—John Bastianelli
(74) *Attorney, Agent, or Firm*—Dennis J. Williamson; Matthew W. Witsil; Moore & Van Allen PLLC

(57) ABSTRACT

A hands-free faucet includes a sensing plate, a capacitor-based sensor circuit, a non-conductive valve housing, a non-conductive seating ring, and a conductive connector. Preferably, the capacitor-based sensor circuit is electrically connected to said sensing plate. Furthermore, the non-conductive valve housing preferably further comprises a valve inlet and valve outlet. Preferably, said non-conductive seating ring is located between the valve inlet and valve outlet, and is traversed by the conductive connector. In a preferred embodiment, the conductive connector is a metal pin.

20 Claims, 9 Drawing Sheets

(AMENDED)

OTHER PUBLICATIONS

PCT International Search Report and Written Opinion of the ISA (the European Patent Office) regarding Appln. No. PCT/US2006/004381, dated Jun. 12, 2006—15 pages.

PCT International Preliminary Report on Patentability regarding Appln. No. PCT/US2006/004381, dated Sep. 7, 2007—11 pages.

PCT International Search Report and Written Opinion of the ISA (the U.S. Patent Office) regarding Appln. No. PCT/US2004/000835, dated Jul. 20, 2005—11 pages.

PCT International Preliminary Report on Patentability regarding Appln. No. PCT/US2004/000835, dated Aug. 25, 2005—6 pages.

PCT International Preliminary Report on Patentability (Chapter II) regarding Appln. No. PCT/US2004/000835, dated Feb. 2, 2006—5 pages.

First Examination Report regarding European Patent Application No. 06734553.8, dated Mar. 3, 2008—1 page.

Substantive Examination Report regarding Malaysia Patent Application No. PI 2004–0083, dated Apr. 4, 2008—5 pages.

Substantive Examination—Clear Report regarding Malaysia Patent Application No. PI 2004–0083, dated Nov. 28, 2008—2 pages.

Examination Report regarding New Zealand Patent Application No. 560880, dated Jun. 18, 2009—1 page.

Examination Report regarding New Zealand Patent Application No. 560880, dated Aug. 13, 2009—2 pages.

Examination Report regarding Taiwan Patent Application No. 93101062, dated Oct. 9, 2008—4 pages.

Examination Report regarding Taiwan Patent Application No. 93101062, dated Apr. 16, 2009—7 pages.

Search Report regarding Taiwan Patent Application No. 93101062, dated Aug. 28, 2009—5 pages.

International Patent Application No. PCT/US2006/004381, International Search Report, dated Dec. 6, 2006.

International Patent Application No. PCT/US2006/004381, Written Opinion, dated Dec. 6, 2006.

International Patent Application No. PCT/US2006/004381, International Preliminary Report on Patentability, dated Aug. 28, 2007.

Malaysian Patent Application No. PI 20040083, Substantive Examination Report, dated Apr. 4, 2008.

* cited by examiner

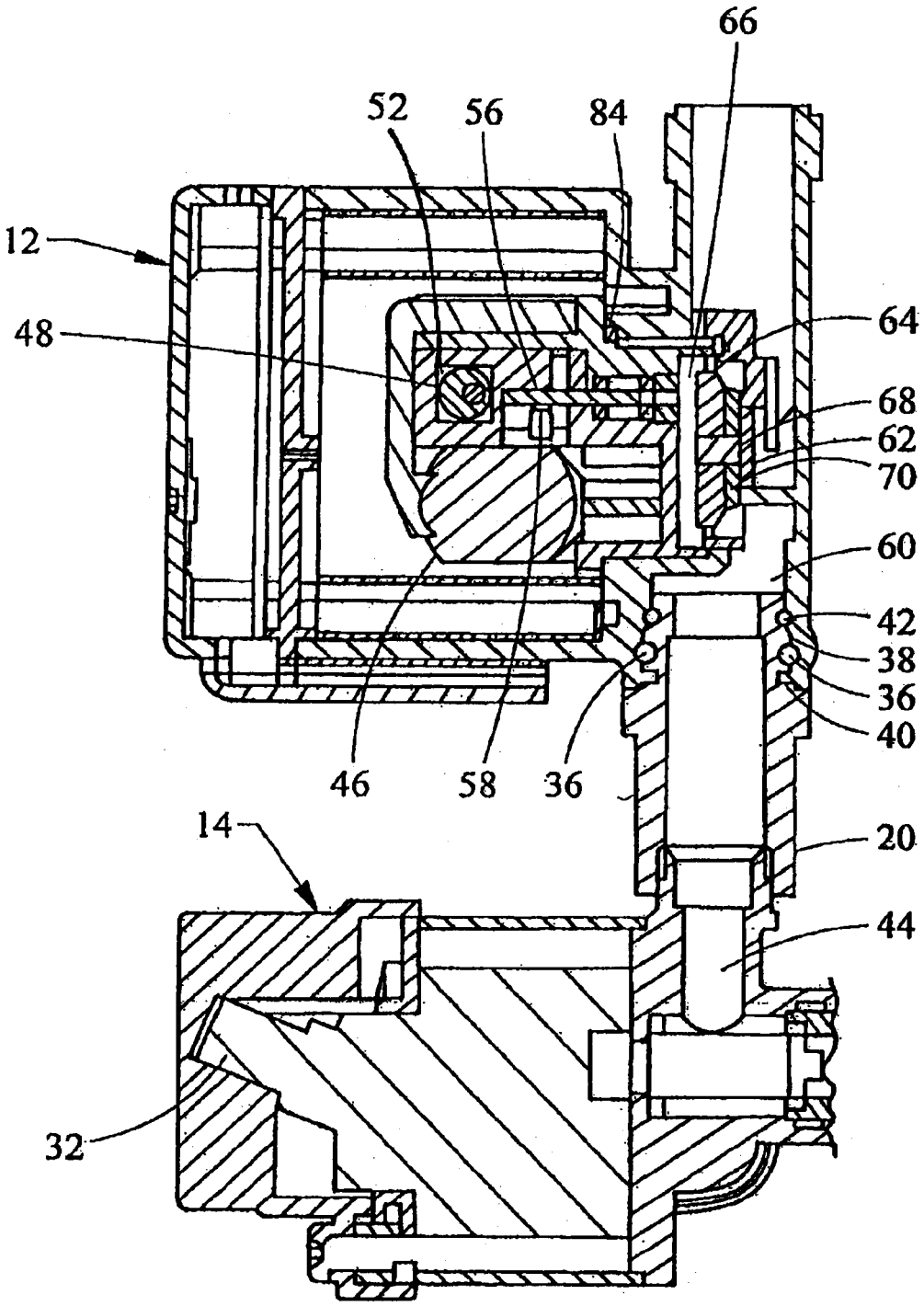
Fig. 3
(AMENDED)

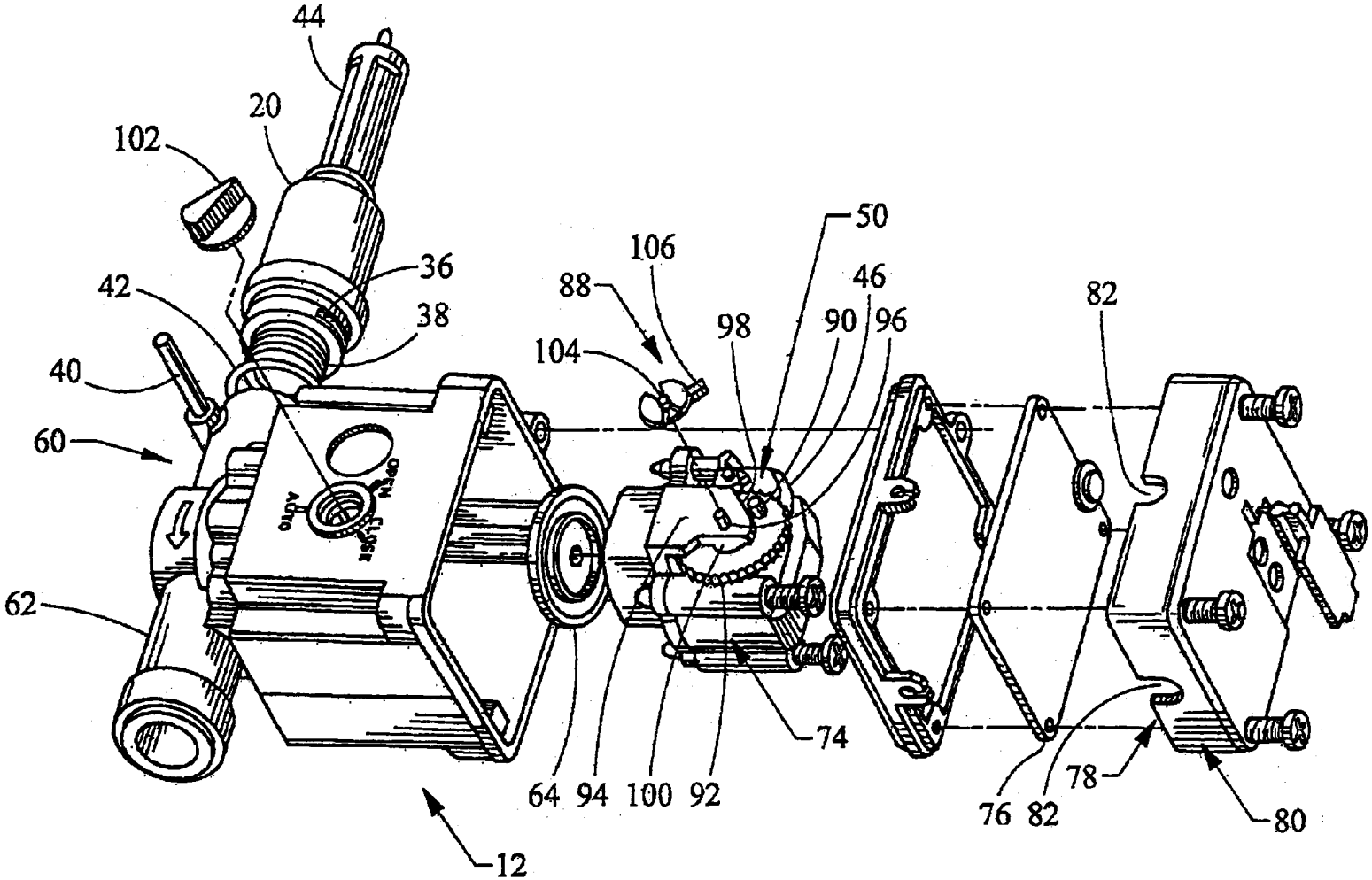
Fig. 4
(AMENDED)

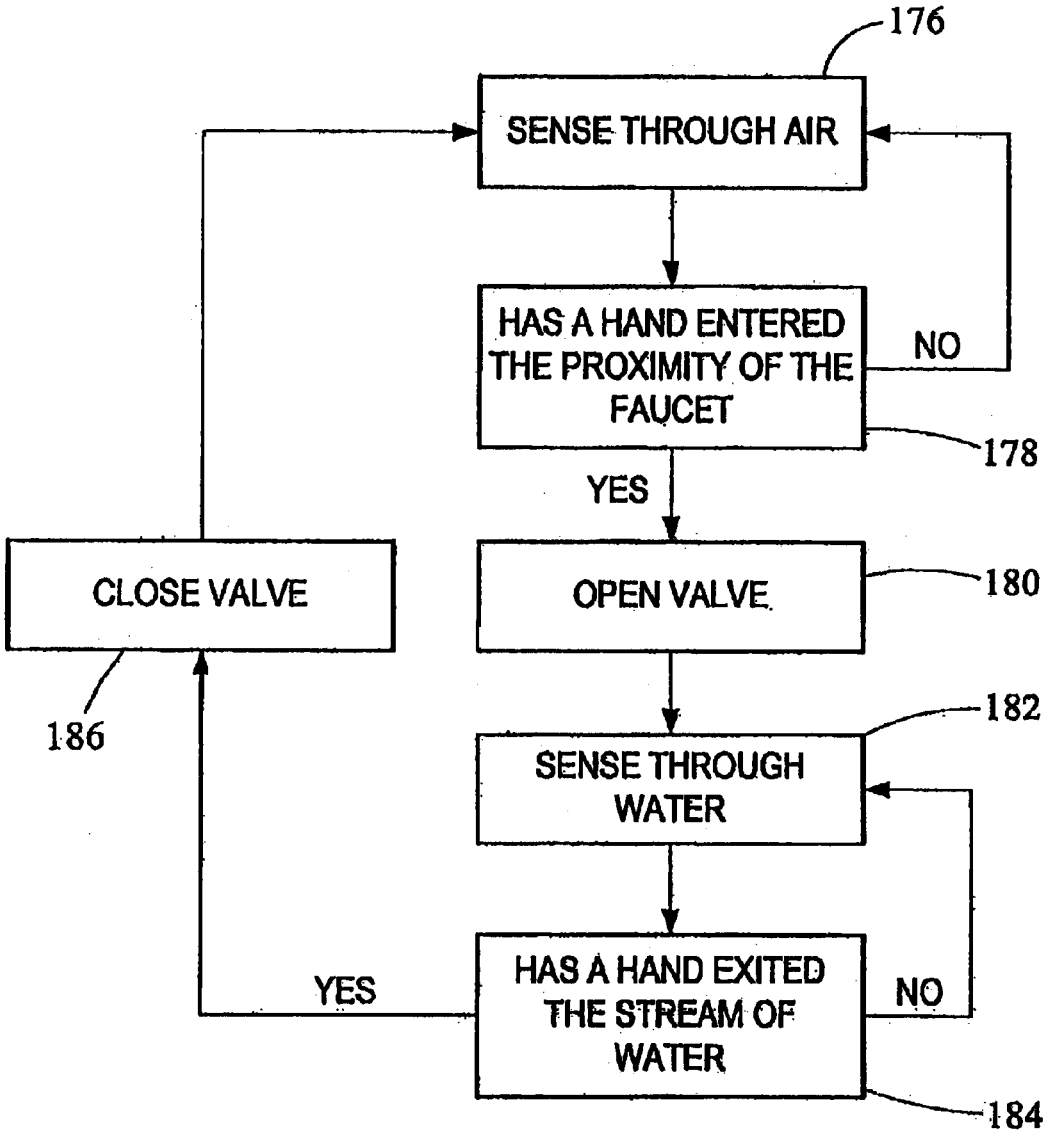
Fig. 7
(AMENDED)

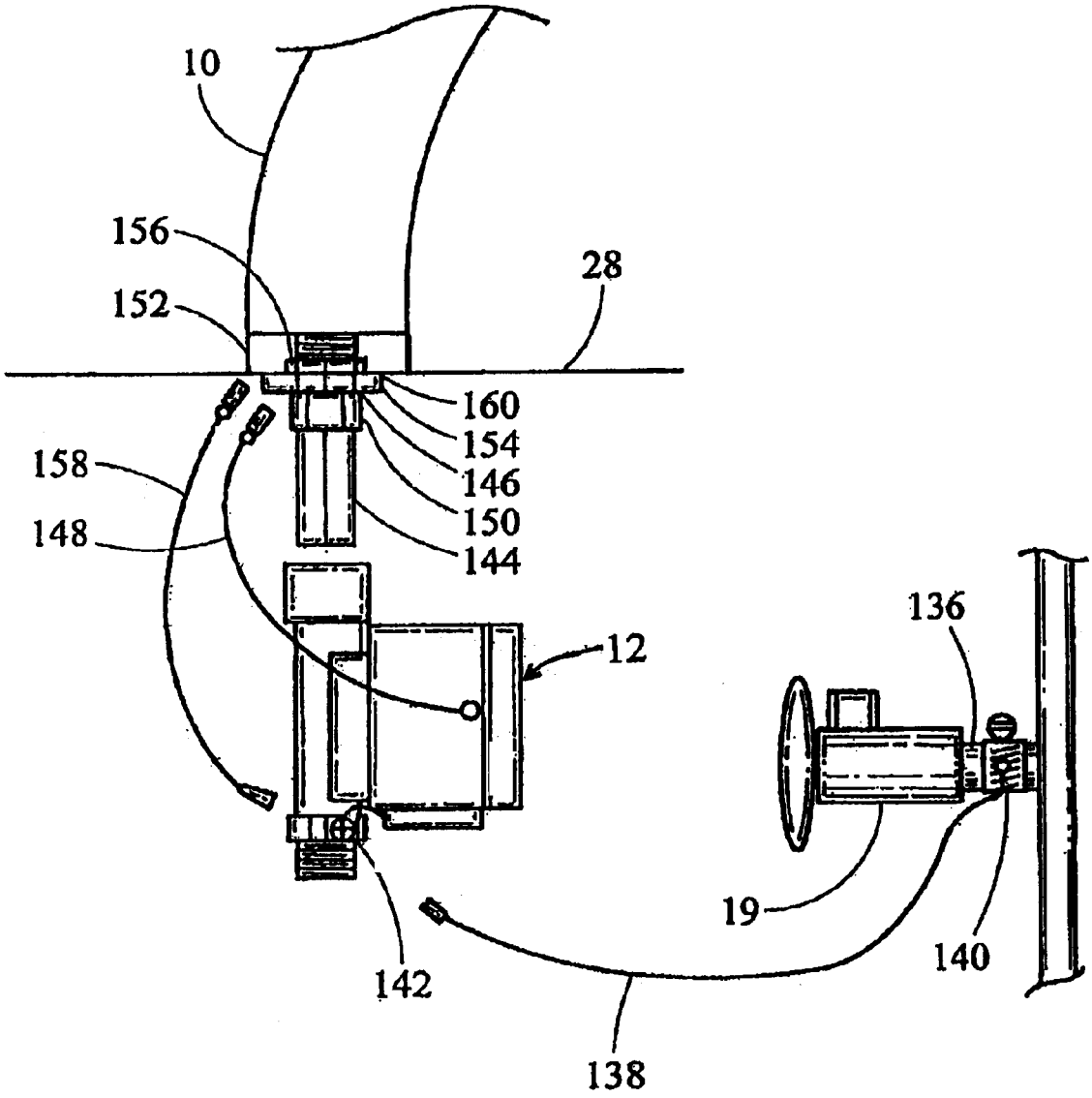
Fig. 9
(AMENDED)

AUTOMATIC PROXIMITY FAUCET

Matter enclosed in heavy brackets [ ] appears in the original patent but forms no part of this reissue specification; matter printed in italics indicates the additions made by reissue.

RELATED APPLICATIONS

The present patent document is a continuation-in-part of U.S. patent application Ser. No. 10/757,839, filed Jan. 14, 2004, now U.S. Pat. No. 7,083,156 which claims the benefit of the filing date under 35 U.S.C. § 119(e) of Provisional U.S. Patent Application Ser. No. 60/441,091, filed Jan. 16, 2003. All of the foregoing applications are hereby incorporated by reference.

FIELD OF THE INVENTION

The invention relates a hands-free faucet and, more particularly, a hands-free faucet that operates consistently and that reduces intermittent and undesired activation and deactivation of fluid flow.

BACKGROUND

A serious drawback in traditional faucets is that they are easily contaminated with germs. The germs can then be transferred from one person using the faucet to the next person using the faucet when each person has touched the handle of the faucet. Many users fear contacting the germs by touching the faucet handle. This fear prevents many users from using faucets in public. A hands-free faucet, on the other hand, eliminates the problem of users contacting germs and the fear of using faucets in public.

In many hands-free faucets, a sensor detects the presence of the user. Many of the sensors use infrared light. In order to sense the user with these units, the user must be located directly in the path of the light beam. Accordingly, if the user does not stand directly in that light path, or moves out of the light path, then the sensor does not detect the user, and the water will not turn on or will turn off before it should. One way to overcome this shortcoming in a hands-free faucet is to utilize a capacitive field sensor. This type of sensor, which works by detecting an electric charge at or near the sensor, can detect the presence of a user whenever he or she is near the faucet. A faucet using a capacitive field sensor is designed to remain activated as long as the user is near the faucet.

Automatic faucets using capacitive field sensors, however, have been found to have several significant problems. First, faucets have turned on for no apparent reason. This appears to have occurred when there is some movement near the faucet, even if not by an approaching user. Such movement can be a nearby faucet turning on, a nearby toilet flushing, or someone walking by the unit. Second, these faucets have not always worked consistently and, at times, would not stay on as long as they should. This appears to have occurred when the sensor switches its operational mode from sensing a user through the air surrounding the sensor, to sensing the continued presence of the user through the flow of water.

The present invention solves these problems in hands-free faucets that use capacitive field sensors. It is desirable, in particular, to have a hands-free faucet that uses a capacitive field sensor and that will turn on only when approached by the person desiring to use the faucet. It is also desirable to have a hands-free faucet that uses a capacitive field sensor in which the faucet will continuously be on, without shutting off prematurely, the whole time that the user is near the faucet and desiring to wash his or her hands.

BRIEF SUMMARY

These and other objectives and advantages are provided in an automatic proximity faucet.

In one embodiment, a hands-free faucet includes a sensing plate, a capacitor-based sensing logic, a non-conductive valve housing, a non-conductive seating ring, and a conductive connector. Preferably, the capacitor-based sensing logic is electrically connected to said sensing plate. Furthermore, the non-conductive valve housing preferably comprises a valve inlet and valve outlet. The non-conductive seating ring is located between the valve inlet and valve outlet, and is traversed by the conductive connector. A wire further connects the capacitor-based sensing logic to an earth ground.

In another embodiment, a hands-free faucet for installation on an electrically conductive surface includes a conductive spout, a non-conductive top and bottom spacer, a capacitor-based sensing logic, a non-conductive valve housing having a valve inlet and valve outlet, an conductive pin within the valve housing which provides a continuous electrical connection between the valve inlet and valve outlet, and an electrically conductive conduit. In this embodiment, the spacer electrically insulates the spout from the conductive surface. Preferably, the capacitor-based sensing logic is electrically connected to the spout. Also, the electrically conductive conduit electrically connects the capacitor-based sensing logic to the electrical ground.

The present invention is defined by the following claims. The description summarizes some aspects of the presently preferred embodiments and should not be used to limit the claims.

BRIEF DESCRIPTION OF THE DRAWINGS

FIG. 3 is a front cutaway view of the mixing and valve housing;

FIG. 4 is a side exploded view of a valve assembly;

FIG. 7 is a flow diagram of a control logic of a sensor utilizing two modes;

FIG. 9 is a side perspective of the hands-free faucet mounted on a sink.

DETAILED DESCRIPTION OF THE DRAWINGS AND THE PRESENTLY PREFERRED EMBODIMENTS

The presently preferred embodiment provides a system for ensuring consistent control of an automatic faucet. In one embodiment, the system contains a faucet that utilizes a sensor to detect the presence of a user within a predetermined proximity of the faucet. The sensor is grounded and isolated to prevent the faucet from shutting off prematurely, and the field of the sensor from extending beyond a predetermined size. As a result, the system provides consistent operation and ensures that the faucet functions as intended.

Figure 1:
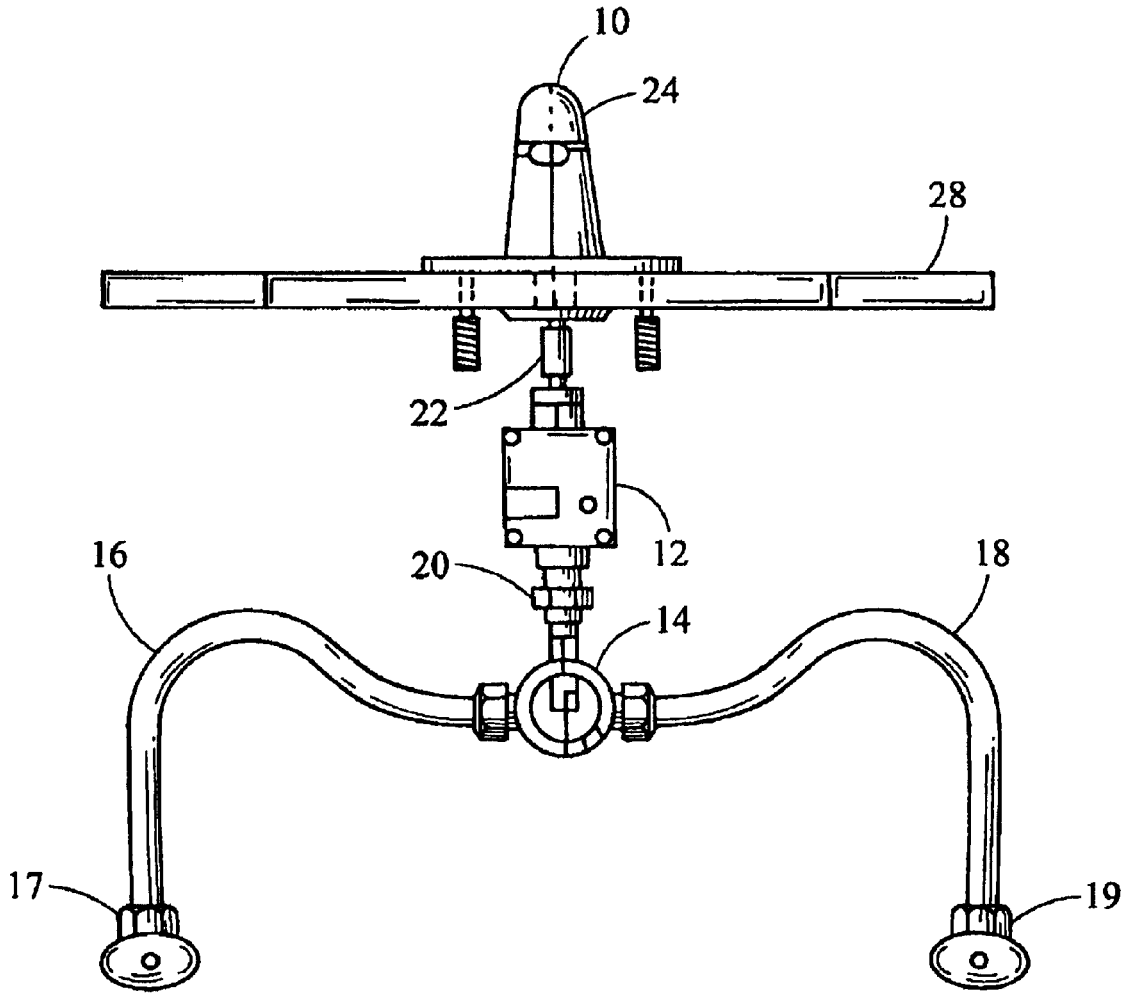
FIG. 1 is a front view of an embodiment of a hands-free faucet.

FIG. 1 shows a front view of an embodiment of an automatic faucet. The embodiment comprises a spout 10, a valve housing 12, and a mixing housing 14. Preferably, hot and cold water enter the system through a hot water inlet line 16 and a cold water inlet line 18. The hot and cold water inlet lines 16, 18 have shut-off valves 17, 19 to allow for simplified maintenance of the system. The hot and cold water inlet lines 16, 18 are operatively connected to the mixing housing 14. In the present embodiment, the hot water inlet line and cold water inlet line 16, 18 are connected to the mixing housing 14 at the nine and three o'clock positions respectively. The hot water inlet line 16 and cold water inlet line 18 are connected to the mixing [valve] *housing* 14 by compression fittings, solder, or other means known in the art.

Preferably, the mixing housing 14 mixes the hot and cold water from the hot water inlet line 16 and cold water inlet line 18 respectively to a desired temperature, as described below. The mixed water then travels through a valve adapter 20 to the valve housing 12. The valve housing 12 contains an electrically-operable valve, hereinafter discussed in detail, which controls the flow of the water. When the valve is open, the stream of mixed water travels through an outlet 22 to the spout 10. Preferably, the spout 10 directs the stream of mixed water through an opening in the spout 10 to the atmosphere.

In an alternate embodiment, a mixing housing 14 is not utilized. In this embodiment, either the hot water inlet line 16, the cold water inlet line 18, or an alternate line is directly connected to the valve housing 12.

In the present embodiment, the spout 10 also serves as a sensing plate 24. In the present embodiment, the sensing plate 24 is electrically connected to a capacitor-based sensor circuit, embodiments of which are described in U.S. Pat. Nos. 5,730,165 and 6,466,036, which are incorporated by reference. The sensing plate 24 and capacitor-based sensor circuit, which will be described hereinafter, serves as a sensor to detect the user. When the sensor detects the approach of a user, it sends the activation signal to a valve actuation mechanism. The valve actuation mechanism then opens the valve. The sensor also monitors the presence of the user, and when the sensor no longer detects a user, the sensor terminates the activation signal, and the valve closes. Although the illustrated sensing plate 24 is a spout 10, the sensing plate 24 can be a separate element positioned adjacent to or away from the spout 10.

Figure 2:
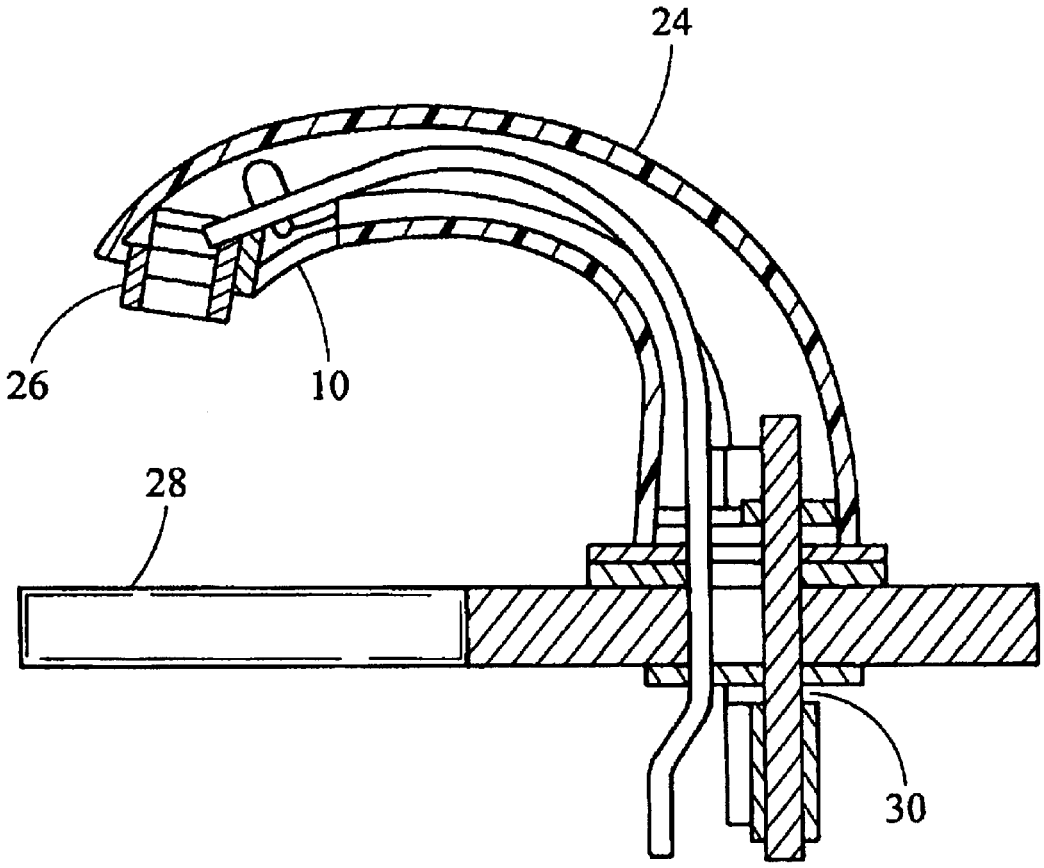
FIG. 2 is a partial cutaway view of a spout mounted to a surface in FIG. 1.

As shown in FIG. 2, an aerator 26 is threaded to the spout 10 at the terminal end of the spout 10. The aerator 26 maintains fluid pressure by mixing air into the fluid. At another end, a threaded fitting 30 couples the spout 10 to a surface 28. In this embodiment, the spout 10 can have many shapes. Besides the rectangular and circular cross-sections that are shown, the spout 10 encompasses many other designs that vary by shape, height, accessories (e.g. use of a built-in or attachable filters, for example), color, etc.

Referring to FIGS. 1 and 3, the presently preferred mixing housing 14 encloses a mixing valve 32. As noted above, hot and cold water are blended to a pre-set temperature. The mixing valve 32 blends the hot and cold waters by combining the two waters utilizing means known in the art. In the present embodiment, the mixing housing 14 and valve housing 12 are connected by a valve adapter 20.

As shown in FIG. 3, in the present embodiment, the mixing housing 14 is coupled to the valve housing 12 by a valve adapter 20. Presently, the valve adapter 20 is a cylinder having a keyway 36 and threads 38 at one end as shown in FIG. 4. When secured to the valve housing 12, a valve pin 40 sits within the keyway 36, ensuring a secure connection between the valve housing 12 and the valve adapter 20. An O-ring 42 preferably provides a positive fluid tight seal between the valve housing 12 and the valve adapter 20. An axial filter 44 can be disposed within the valve adapter 20 to separate fluids from particulate matter flowing from the mixing housing 14 to the valve housing 12. The filter 44 can comprise a mesh or a semi-permeable membrane. In another embodiment, other materials that selectively pass fluids without passing some or all contaminants can be used as a filter. In an alternate embodiment, the valve housing 12 and mixing housing 14 are combined into a unitary housing. In this alternate embodiment, a valve adapter 20 is not required.

As shown in FIGS. 3 and 4, the valve housing 12 encloses a motor 46. Preferably, the motor 46 is mechanically coupled to a cam 48. In the embodiment, the cam 48 is a wheel with a varying radius. The cam 48 is mounted to the motor 46 through a shaft and gear train 50. Preferably, the cam 48 and a cam follower 52 translate the rotational motion of the shaft into a substantially linear movement that opens and closes a diaphragm [54] *64*. In this embodiment, the cam 48 has an offset pivot that produces a variable or reciprocating motion within a cutout portion of the cam follower 52. The cam follower 52 is moved by the cam 48 within an orifice, which engages a rod-like element. Preferably, the rod-like element comprises a pilot 56 that slides through an orifice 58. Movement of the pilot 56 can break the closure between the inlet port 60 and the outlet port 62 by moving the diaphragm 64.

The diaphragm 64 is connected to the pilot 56 by a bias plate 66. Preferably, the diaphragm 64 is coupled between legs of the bias plate 66 by a connector 68. In this embodiment, the connector 68 comprises a threaded member. However, the connector 68 can be an adhesive, a fastener or other attaching methods know in the art.

Figure 5:
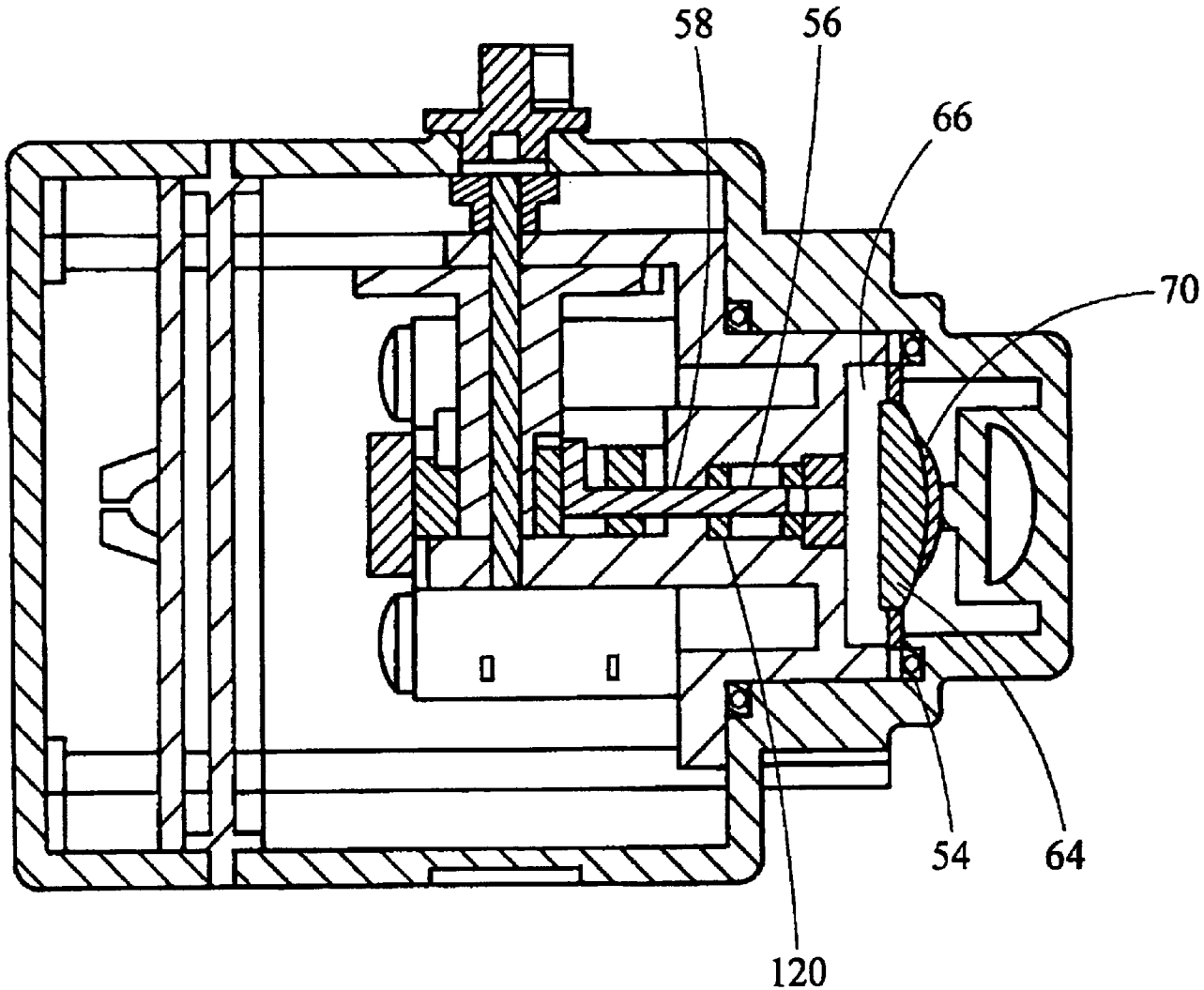
FIG. 5 is a partial top cutaway view of FIG. 3.

As shown in FIGS. 3–5, when the valve mechanism is closed, the diaphragm 64 sits against a seating ring or seating surface 70. In this position, the fluid and the pilot 56 exert a positive pressure against the diaphragm 64 which assures a fluid-tight seal between the inlet port 60 from an outlet port 62. When the pilot pressure is released the fluid pressure acting on the underside of the diaphragm 64 exceeds the seating pressure of the fluid pressing against the inlet surface of the diaphragm 64. When the pressure is greater on the underside than that on the inlet side, the diaphragm 64 is forced up which opens the valve and allows for a continuous angled fluid flow. When a pilot pressure is re-exerted, a fluid backpressure builds up on the inlet surface of the diaphragm 64. Preferably, the pilot 56 and fluid backpressure force the diaphragm 64 to seat, which in turn, stops the flow. The build up of backpressure occurs after the sensor no longer senses an appendage such as a hand.

As shown in FIGS. 3–5, the diaphragm 64, which is the part of a valve mechanism that opens or closes fluid communication between the inlet port 60 and the outlet port 62, is wedge-shaped. Some diaphragms 64, however, can have a uniform thickness throughout or have many other shapes depending on the contour of the seating surface.

FIG. 4 shows an exploded view of the valve assembly [72]. A housing 12 encloses a pilot valve assembly 74 and a board containing the sensor circuit 76. In this embodiment, the capacitor-based sensor circuit 76 interfaces the sensing plate 24 to the motor 46. A compression of a molding 78 that outlines the lower edges of the housing cover 80 causes a fluid tight seal to form around the edges of the housing 12. Preferably, power to the sensor circuit 76 and motor 46 are passed through the sides of the housing cover 80 through orifices 82. In the present embodiment, battery packs provide the primary power. Preferably, low-voltage direct current power supplies or battery packs drive a Direct Current motor and the logic. In an alternate embodiment, the power is provided by hardwired alternating current with or without a battery backup.

The pilot valve assembly 74 of the hands-free embodiment shown in FIG. 3–5 is preferably comprised of the motor 46, its shaft, the cam 48, the cam follower 52, the gear train 50, and the pilot 56. Preferably, the O-ring 84 shown in FIG. 3 makes a fluid tight seal between the motor 46, its shaft, the cam 48, cam follower 52, the gear train 50 and a portion of the pilot 56. Preferably, the seal is located approximately three quarters down the length of the pilot valve assembly 74.

In the present embodiment, the hands-free faucet also includes an override control that allows for continuous water flow without requiring a user to be present. The override control shown in FIG. 4 comprises an override arm 88. The override arm 88 fits on a stem 90. The stem 90 is a cylindrical projection extending from an outward face of one of the interconnected gears that form the gear train 50. In this embodiment, the stem 90 is a part of a spur gear 92 having teeth radially arrayed on its rim parallel to its axis of rotation.

In the present embodiment, a strike plate 94 is connected to the spur gear 92 by a shaft 96. The shaft 96 transmits power from the motor 46 through the gear train 50 to the pilot 56. As shown, the strike plate 94 can interrupt the rotation of the shaft 96 and gear train 50 when the pilot 56 reaches a top or a bottom limit of travel, preferably established by the stem 90 contacting the convex surfaces of the strike plate 94. At one end, the stem 90 strikes a positive moderate sloping side surface 98 of the strike plate 94. At another end, the stem 90 strikes a substantially linear side surface 100.

Preferably, an override knob 102 shown in FIG. 4 is coupled to an override shaft 104 projecting from the override arm 88. In this embodiment, when the override knob [86] *102* is turned clockwise, the gear train 50 rotates until a projection 106 on the override arm 88 strikes the substantially linear side surface 100 of the strike plate 94. In this position, the pressure on the underside of the diaphragm [54] *64* will be greater than that on the inlet side, and the valve will be open.

Preferably, an electronic detent locks the movement of the shaft 96 until the sensor detects a user or the override knob 102 is manually turned to another mode. When the sensor detects a user, the valve remains open. When the user is no longer detected, which can occur when the sensor no longer senses an appendage, the hands-free embodiment automatically returns to its automatic mode. As the hands-free embodiment transitions from the open to the automatic mode, the override knob 102 will automatically rotate from the open marking to the auto marking on the housing. In this embodiment, [fixtures are] *the hands-free faucet is* continuously flushed by an uninterrupted fluid flow that is shut off by a sensor detection after a manual selection.

While some embodiments encompass only an open and an automatic mode, another hands-free embodiment also encompasses a closed mode. In this mode, the valve is closed and the motor 46 will not respond to the sensor. While such a control has many configurations, in one embodiment this control can be an interruption of the ground or power source to the motor 46 by the opening of an electronic, mechanical, and/or an electromechanical switch. Only a turning of the override knob 102 to the automatic or open mode will allow fluid to flow from the inlet port 60 to the outlet port 62.

Figure 6:
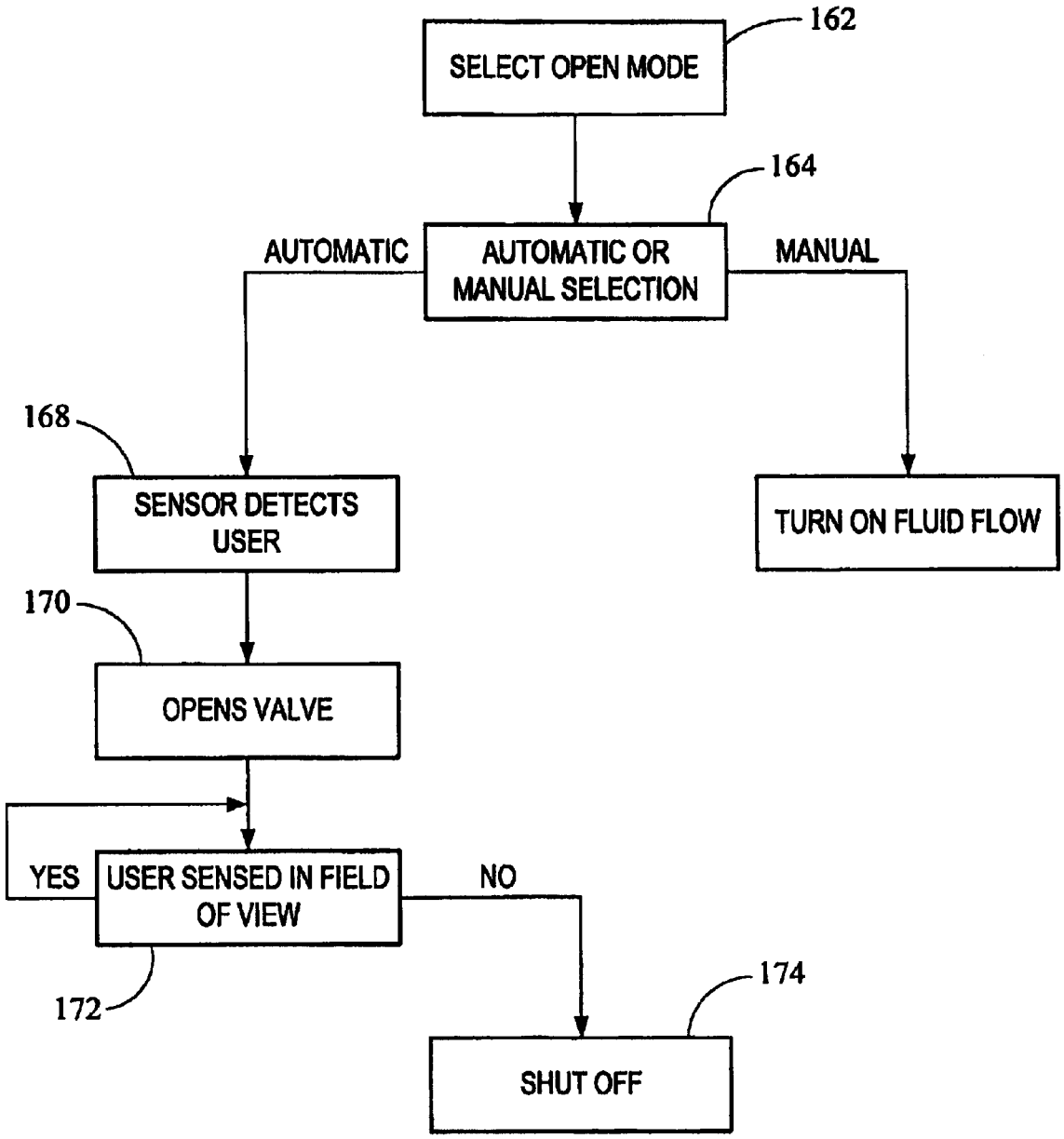
FIG. 6 is a flow diagram of a manual override method.

As shown in FIG. 6, the operation of the open mode begins when an open selection is made at act 162. Once the open selection is made, fluid flows. Fluid flow is shut off by either an automatic or manual selection at act 164. In a manual mode, the detection of a user biases the motor 46 to rotate the gear train 50 which is already in an open position. When a user is no longer detected, the motor 46 rotates the gear train 50 and the override knob 102 to the auto position shutting off fluid flow [at act 166]. In an automatic selection, the sensor initiates a fluid flow when a user is detected in a field of view at act 168. When an activation signal is received, an electronic switch electrically connected to the sensor actuates the motor 46 at act 170. Once the user is no longer detected, the motor [64] *46* rotates the gear train 50, cam 48, and the cam follower 52 from an active state of continuous fluid flow to an inactive state of no fluid flow at acts 172 and 174. When in an automatic state, fluid will again flow when a user is again detected in the field of view.

The above-described system provides an easy-to-install, reliable means of flushing a hands-free fixture without requiring continuous sensor detection. While the system and has been described in cam and gear embodiments, many other alternatives are possible. Such alternatives include automatic actuators, solenoid-driven systems, and any other system that uses valves for fluid distribution.

Furthermore, the detent is not limited to an electronic detent that can be unlocked by an activation signal sourced by a sensor. The electronic detent can comprise a programmable timing device that sustains an uninterrupted fluid flow for an extended period of time. Moreover, the hands-free system and method also embrace mechanical detents, for example, that lock movement of the motor [64] *46* or the gear train 50 and/or the shaft 96. One such embodiment can comprise a catch lever that seats within a channel of the spur gear 92 of the gear train 50. Preferably, the torque of the motor [64] *46* and/or a manual pressure can unlock some of these embodiments.

Many other alternative embodiments are also possible. For example, the mixing valve 14 shown in FIGS. 1 and 3 can comprise an above surface or an above-deck element that provides easily accessible hot and cold adjustments which allows users to adjust or preset the temperature of the water being dispensed from the spout 10. In an alternative embodiment, the hand-free fixture can include a scalding prevention device, such as a thermostatic control that limits water temperature and/or a pressure balancing system that maintains constant water temperature no matter what other water loads are in use, as known in the art Preferably, the non-scalding device and pressure balancing systems are interfaced to and control the mixing valve 14 and are unaffected by water pressure variations.

In yet another alternative embodiment, the limits of travel of the pilot 56 can be defined by the contacts between the override arm 88 and the convex surfaces of the strike plate 94. At one end of this embodiment, the override arm 88 strikes a positive moderate sloping side surface 98 of the strike plate 94 and at another end the override arm 88 strikes a substantially linear side surface 100. In another alternative, pilot 56 movement causes the pilot supply air 120 shown in FIG. 5 to be vented to the atmosphere which unseats the diaphragm 64 allowing fluid to flow from the inlet *port 60* to the outlet port [60 and]62. In this embodiment, the fluid which comprises a substance that moves freely but has a tendency to assume the shape of its container will flow continuously until the venting is closed. Once the vent is closed, a backpressure builds up on the diaphragm [54] *64* isolates the inlet port 60 from the outlet port 62.

Installation of the hands-free embodiments can be done above or below a sink deck or surface. While the complexity of the installation can vary, the above-described embodiments can use few pre-assembled parts to connect the outlet port 62 to an output accessory. For example, a valve pin seated within a keyway can provide a seal between the valve housing and the output accessory. An O-ring can also be used to provide a positive fluid tight seal between the valve housing and accessory.

As illustrated in FIG. 7 above, the sensor circuit 76 controls the sensor. In a preferred embodiment, the software involves two modes of operation. The first mode 176 of operation is through the air. During this mode, the sensor provides a group of short pulses through the air. When a user approaches, the sensor detects the user at act 178, and the sensor circuit 76 sends a signal to activate the motor 46, which opens the valve at act 180, and the sensor circuit 76 switches to the second mode of operation. The second mode 182 operates through the stream of water. In this mode, the sensor monitors the presence of the user in the water stream at act 184. When the user is no longer in the water stream, the sensor detects the absence of the user, and deactivates the motor [64 at act 186] *46*, thereby closing the valve *at act 186*, and shutting off the water flow. The sensor circuit 76 then returns to the first mode of operation 176.

To ensure consistent operation of the sensor, a consistent ground reference must be maintained during transition between the two modes of operation. More specifically, a consistent ground reference must be maintained during the transition from sensing through the air 176 to sensing through the water stream 182. In the present embodiment, the non-conductive [input] *inlet* port 60 and [output] *outlet* port 62 are situated within a non-conductive valve housing 12. Prior to the detection of a user, a diaphragm 54 separates the inlet port 60 from the outlet port 62. In the preferred embodiment, the diaphragm 54 is made of rubber, and therefore, interrupts the ground potentially provided by the water in the inlet port 60 and outlet port 62. In the present embodiment, a consistent ground reference is accomplished by electrically connecting the [input] *inlet* port 60 to [output] *outlet* port 62 regardless of the position of the diaphragm 54.

Figure 8:
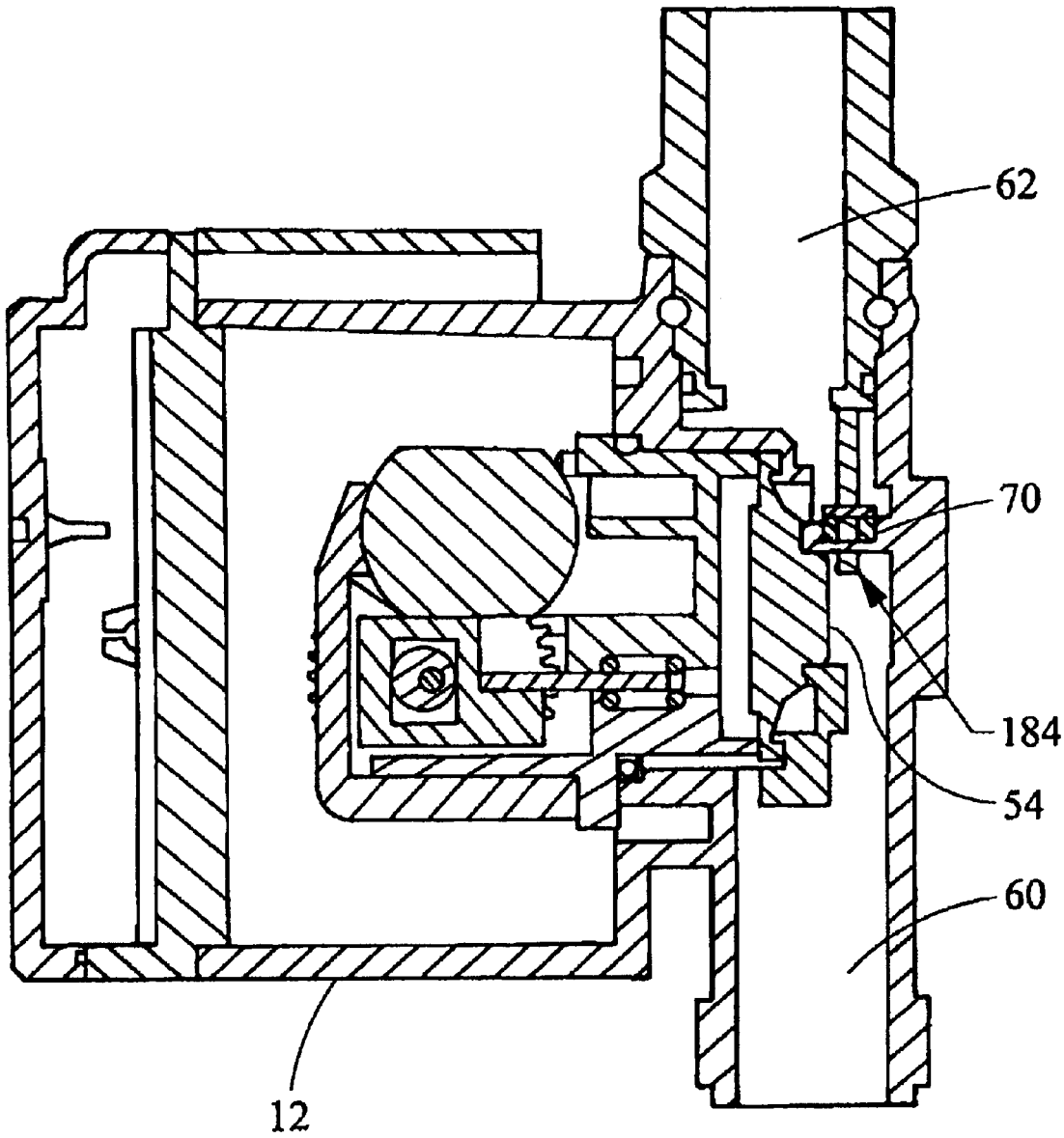
FIG. 8 is a side cutaway view of a valve housing.

As indicated in FIG. 8, a pin 184 is present to electrically connect the [input] *inlet* port 60 to the [output] *outlet* port 62 through the seating surface 70. By locating the pin 184 in the seating surface 70, the pin 184 electrically connects the [input] *inlet* port 60 to the [output] *outlet* port 62 regardless of the position of the diaphragm 54. The pin 184 prevents a large change in the ground reference when the diaphragm 54 opens; thereby providing a stable ground reference connection between the inlet port 60 and outlet port 62. The establishment of a stable ground reference ensures that the change in resistance remains in the normal range of the signal, thereby preventing premature deactivations.

As shown in FIG. 9, the presence of a direct ground further ensures a robust ground reference. In the present embodiment, the direct connection to the earth ground 136 is obtained through a first ground wire 138 connecting the sensor circuit 76 to an earth ground 136. Presently, the earth ground 136 is a metal pipe that leads to the cold water inlet valve 19. The first ground wire 138 is electrically attached to the earth ground 136 by a metallic clamp 140. In the preferred embodiment, a screw 142 serves as a junction between the first ground wire [130] *138* and a ground wire 141 originating from the sensor circuit 76, which is located within the valve housing 12. In alternate embodiments, the first ground wire [130] *138* can be attached directly to the earth ground 136, or by any other means that allows electricity to be conducted from the first ground wire [130] *138* to the earth ground 136. By bypassing any crimps in metal braided fittings or any pipe tape or dope, the direct ground avoids any possible compromises to the ground connection. The direct ground further provides a robust ground reference that decreases the possibility of the faucet prematurely activating.

Installation of the preferred embodiment onto or near a metallic surface 28, including but not limited to stainless steel and cast iron sinks, requires additional grounding. More specifically, in the preferred embodiment, the spout 10 is electrically connected to the sensor circuit 76 by a sensing wire 148. The sensing wire 148 extends from the sensor circuit 76 and is connected to an electrically conductive stem 144 of the spout 10 by a first metallic tab washer 146. In the preferred embodiment, the stem 144 contains threading and is situated in a aperture within the metallic surface 28. A nut 150 secures the first metallic tab washer 146 to the stem 144. The nut 150 contains threading that corresponds to the threading on the stem 144. Preferably, the nut 150 is electrically conductive, as to ensure an electrical connection between the first metallic tab washer 146 and the stem 144.

To ensure that spout 10, stem 144, tab washer 146, and nut 150 are not in electrical contact with the metallic surface 28, the assembly contains a top spacer 152 and a bottom spacer 154. In the present embodiment, the top spacer 152 is positioned between the spout 10 and the surface 28. The top spacer 152 contains a similar cross-section to that of the spout 10. However, the top spacer 152 in other embodiments may utilize other shapes that isolate the spout 10 from the surface 28. The top spacer 152 contains an aperture through which the stem 144 can be positioned.

Preferably, the bottom spacer 154 is positioned below the metallic surface 28, but above the first metallic tab washer [160] *146*. The bottom spacer 154 in the present embodiment has a washer shape; although other embodiments may contain bottom spacers of other shapes. The bottom spacer 154 contains an aperture through which the stem 144 can be positioned. In the present embodiment, the bottom spacer has a ridge 156, which is located around the diameter of the aperture of the bottom spacer 154. In the preferred operation, the ridge 156 extends through the metallic surface 28 and enters the aperture of top spacer [154] *152*, thereby completely isolating the stem 144, spout 10, and sensor wire 148 from the metallic surface 28, while allowing the nut 150 to be tightened onto the stem 144 to ensure that the spout 10 is securely attached to the metallic surface 28. The tightening of the nut 150 also ensures that the sensor wire 148 has an electrical connection to the stem 144 and spout 10. To ensure proper isolation, the top spacer 152 and bottom spacer 154 should be made of an electrical insulator.

In the preferred embodiment, a second ground wire 158 grounds the metallic surface 28. In the present embodiment, the second ground wire 158 is electrically connected to the metallic surface 28 by a second metallic tab washer [154] *160*. The second metallic tab washer [154] *160* is located between the metallic surface 28 and the bottom spacer 154. The second metallic tab washer [154] *160* contains an aperture through which the ridge 156 of the bottom spacer 154 can be [position] *positioned*. The ridge 156 thereby isolates the second metallic tab washer [154] *160* from the stem 144 and spout 10. In the presently preferred embodiment, the second ground wire 158 is electrically connected to the first ground wire 138 by the screw 142 that serves as a junction.

By isolating and grounding the metallic surface 28, the sensing plate 24 is limited to the stem 144 and spout 10, and therefore, the hands-free faucet will not activate when a user approaches the metallic surface 28, but does not approach the spout 10. In an alternate embodiment, the second ground wire 158 can be directly connected to the earth ground 136.

It is therefore intended that the foregoing detailed description be regarded as illustrative rather than limiting, and that it be understood that it is the following claims, including all equivalents, that are intended to define the spirit and scope of this invention.

The invention claimed is:

1. A hands-free faucet in the proximity of an electrical ground to provide water from at least one reservoir comprising:

a conductive sensing plate;

a capacitor-based sensor circuit electrically connected to said sensing plate;

a non-conductive valve housing having a valve inlet and valve outlet, wherein said valve outlet is operatively connected to said conductive [spout] *sensing plate*;

a non-conductive seating ring situated between said valve inlet and said valve outlet;

a conductive connector traversing said seating ring; and a grounding wire connecting said capacitor-based sensor circuit to said electrical ground.

2. The hands-free faucet of claim 1 further comprising a non-conductive diaphragm in the proximity of the [diaphragm seat] *seating ring*, wherein in a first state, said diaphragm does not contact said [diaphragm seat] *seating ring*, and in a second state, said diaphragm operatively seals said valve inlet from valve outlet.

3. The hands-free faucet of claim 2 wherein said conductive connector is a metal pin.

4. The hands-free faucet of claim 3 further comprising a motor *including a shaft*, wherein said motor is operatively connected to said diaphragm, and switches said diaphragm from said first state to said second state when activated.

5. The hands-free faucet of claim 4 wherein said capacitor-based sensor circuit is electrically connected to said motor.

6. The hands-free faucet of claim 5 wherein said sensing plate is a spout.

7. The hands-free faucet of claim 6 wherein said sensing plate and said capacitor-based sensor circuit comprise a proximity sensor.

8. The hands-free faucet of claim 7 wherein said proximity sensor operates in a first mode that senses the presence of a user by sending a plurality of short pulses.

9. The hands-free faucet of claim 8 wherein said proximity sensor operates in a second mode that senses the presence of a user by sending a plurality of wide pulses.

10. The hands-free faucet of claim 9 wherein said proximity sensor switches from said first mode to said second mode when said proximity sensor detects a user.

11. The hands-free faucet of claim 10 wherein said proximity sensor switches from said second mode to said first mode when said proximity sensor no longer detects a user.

12. The hands-free faucet of claim 7 wherein said motor receives an activation signal from said proximity sensor[;], *and further comprising:* an override control coupled to the motor, said override control being configured to allow a continuous flow of fluids through said faucet when said motor is not receiving said activation signal from said proximity sensor; and an electronic detent coupled to the override control, the electronic detent being configured to unlock and allow movement [said] *of the shaft of the motor when* the activation signal is received from said override control.

13. The hands-free faucet of claim 6 further comprising [a] nonconductive top and bottom [spacer] *spacers* located between said spout and a surface upon which the spout is mounted.

14. The hands-free faucet of claim 13 further comprising a second grounding wire electrically connecting said surface to said electrical ground.

15. The hands-free faucet of claim 1 wherein said conductive sensing plate is electrically connected to said capacitor-based sensor circuit by a sensing wire.

16. A hands-free faucet for installation on an electrically conductive surface in the proximity of an electrical ground comprising:

a conductive spout;

[a] non-conductive top and bottom [spacer] *spacers* located between said spout and said conductive surface;

a capacitor-based sensor circuit electrically connected to said spout;

a non-conductive valve housing having a valve inlet and valve outlet, wherein said valve outlet is operatively connected to said conductive spout;

a conductive pin within said valve housing which provides a continuous electrical connection between said valve inlet and valve outlet; and a first electrically conductive conduit electrically connecting said capacitor-based sensor circuit to said electrical ground.

17. The hands-free faucet of claim 16 wherein said electrically conductive surface is electrically connected to said electrical ground.

18. The hands-free faucet of claim 17 further comprising a second electrically conductive conduit electrically connecting said electrically conductive surface to said electrical ground.

19. The hands-free faucet of claim 18 wherein said second electrically conductive conduit is electrically connected to said first electrically conductive conduit.

*20. The hands-free faucet of claim 16, wherein the spout includes a stem, and the non-conductive top and bottom spacers electrically isolate the spout from the conductive surface.*

* * * * *